United States Patent [19]

Westerkamp

[11] Patent Number: 4,878,270
[45] Date of Patent: Nov. 7, 1989

[54] ROPE TIE-DOWN APPARATUS

[76] Inventor: Myron M. Westerkamp, 2526 E. Solano Dr., Phoenix, Ariz. 85016

[21] Appl. No.: 349,427

[22] Filed: May 9, 1989

[51] Int. Cl.⁴ ............................................. F16G 11/00
[52] U.S. Cl. ................................. 24/132 R; 24/134 R
[58] Field of Search ... 24/132 R, 132 W L, 132 A A, 24/133, 134 R, 136 L, 136 A

[56] References Cited

U.S. PATENT DOCUMENTS

| | | | |
|---|---|---|---|
| 420,962 | 2/1890 | Reimers | 24/134 R |
| 434,691 | 8/1890 | Wilcox | 24/134 R |
| 1,660,040 | 2/1928 | Kehtonen | |
| 1,725,324 | 8/1929 | Whitehead | |
| 2,053,018 | 9/1936 | Bell | 24/134 R |
| 2,228,831 | 1/1941 | Laquerre | 24/134 R |
| 2,442,266 | 5/1948 | Davis | 280/179 |
| 2,547,370 | 4/1951 | Boyer | 24/133 |
| 2,715,008 | 8/1955 | Huber | 248/361 |
| 3,017,678 | 1/1962 | Christensen | 24/134 |
| 3,091,207 | 5/1963 | Songer | 24/134 R |
| 3,099,055 | 7/1963 | Huber | 24/68 C D |
| 3,256,579 | 6/1966 | Hoover | 24/134 R |
| 3,437,981 | 4/1969 | Keller | 24/134 R |
| 3,524,229 | 8/1970 | Mindt | 24/132 |
| 3,813,077 | 5/1974 | Kolic | 251/9 |
| 4,300,269 | 11/1981 | Boden | 24/134 |
| 4,308,643 | 1/1982 | Montplaisir | 24/132 W L |
| 4,425,862 | 1/1984 | Hirsch et al. | 24/134 R |
| 4,541,149 | 9/1985 | Jensen | 24/134 |

FOREIGN PATENT DOCUMENTS

| | | | |
|---|---|---|---|
| 281548 | 8/1913 | Fed. Rep. of Germany | 24/136 A |
| 7426 | of 1908 | United Kingdom | 24/132 R |
| 1880 | of 1913 | United Kingdom | 24/136 A |

Primary Examiner—Victor N. Sakran
Attorney, Agent, or Firm—LaValle D. Ptak

[57] ABSTRACT

A rope tie-down clamp apparatus is provided for quickly and easily tightening and securing a rope between two points. The rope is formed with a loop at one end, and the end of the rope is secured to the housing of the clamping apparatus. A passage is provided through the housing for the length of rope, and the clamping cam is mounted for movement in the housing from a first position engaging the rope in the passageway to a second position out of engagement with the rope. The clamping cam may be manually moved out of engagement with the rope to facilitate adjustment of the rope length and the loop formed by the rope and the housing of the clamping apparatus.

19 Claims, 2 Drawing Sheets

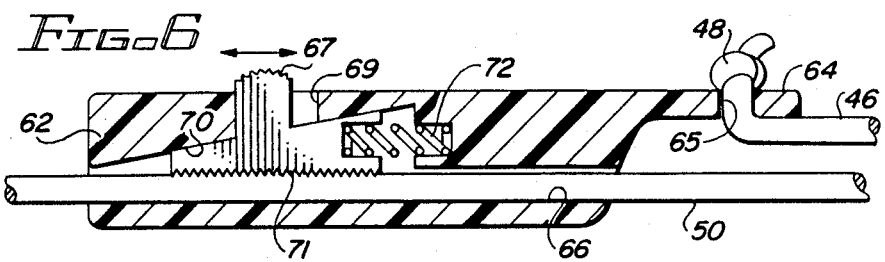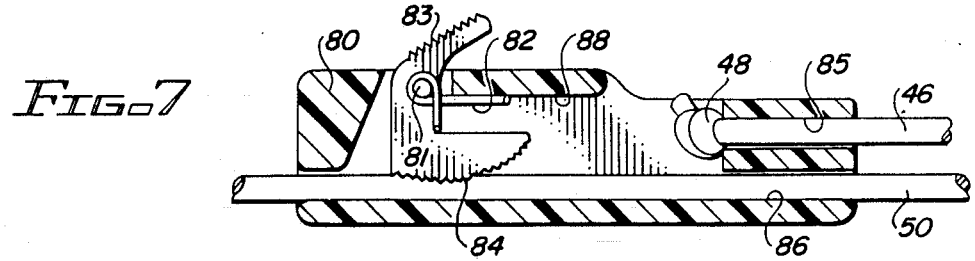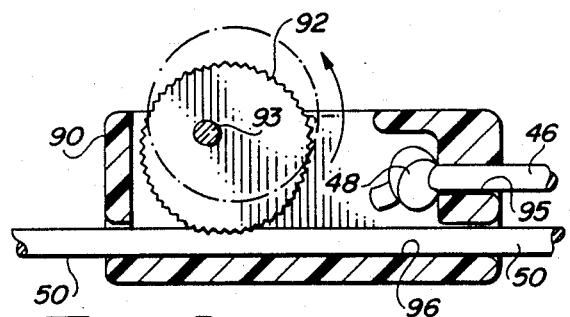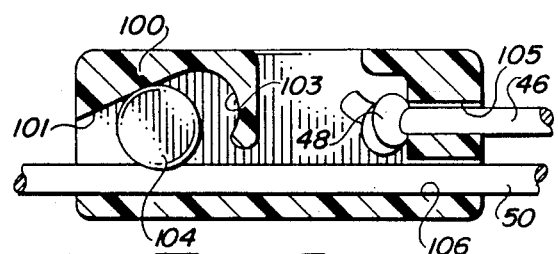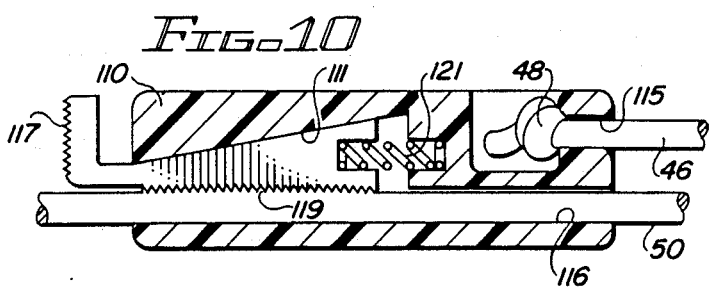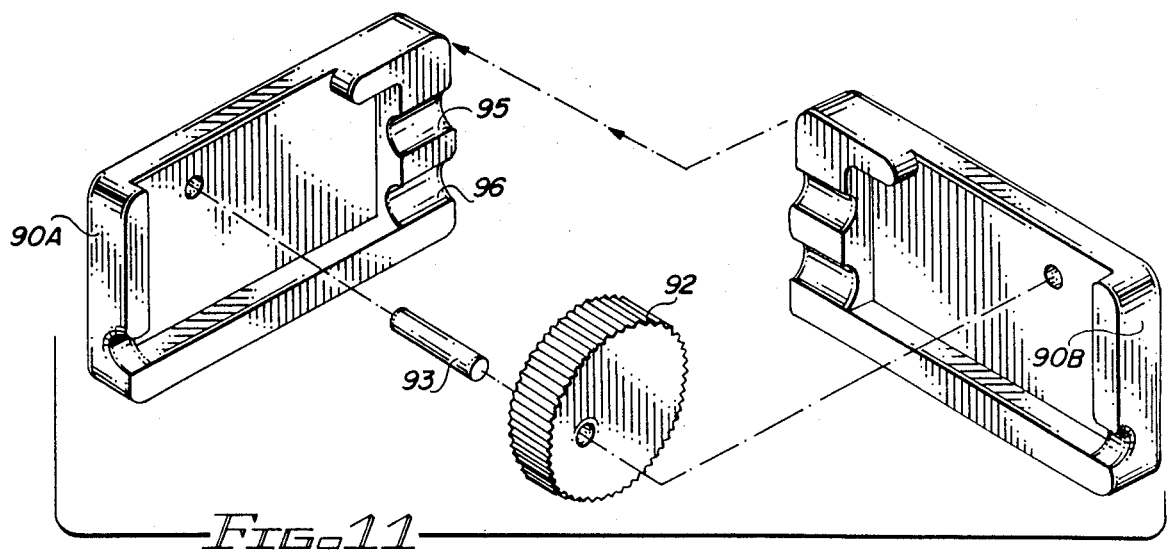

ROPE TIE-DOWN APPARATUS

BACKGROUND

A wide range of applications exist for clamping devices used with ropes, cables and the like for facilitating the fastening and tensioning of such ropes or cables between two points or across a load. Such devices typically work with a loop of the rope or cable, one end of which is secured to the device and the other end of which passes through the device. Various arrangements then are made to permit enlargement or diminishing of the loop to effect an overall adjustment in the length of the rope between the loop and the opposite end. When the desired length is obtained, the device is secured to the rope to prevent either enlargement of the loop or to prevent dimishing to the loop, depending upon the manner of use of the device.

The Patent to Huber No. 3,099,055 discloses a typical strap holding and tensioning device of the type used to secure loads onto the surface of a flatbed truck or the like. The Huber device provides for a multi-turn, doubled-back loop of the strap through the tensioning device which has a tightening lever on it for pressing together two portions of the strap while at the same time pulling the loop tighter as the device is tightened to the clamping position. This is a relatively complex, heavy duty device and is not one which would be used by homeowners or the like for relatively light duty applications.

The Patent to Hoover No. 3,256,579 is directed to a cable clamp for forming a relatively permanent loop in the end of a cable after it has been positioned. The clamp simply wedges a tight cam against the two sides of the cable passing through a restricted passageway to form the desired loop. The device is not used to tension the cable, but simply forms a secure loop in the end of it.

The Patent to LaQuerre No. 2,228,831 is directed to a fastener for clothesline rope. This patent uses a pivoted handle through which the unsecured end of a rope extends. The other end of the rope is attached to the base portion of the device. A clothes line is looped between a pair of poles and the free end of the rope passes through the device. The rope then is pulled tight. The handle is moved from an open position to a closed position, where a toothed dog engages the line to secure it in place in the device. Two sets of pivots are provided, one between the handle and the main body of the device to which the end of the rope is secured and the other between the handle portion and the dog which pivots into engagement with the rope.

The Patent to Bell No. 2,053,018 discloses an adjustable clamp used to provide a loop in the free ends of plow lines or the like. One end of the plow line is secured to the device. The other end then passes through the device which is generally in the form of an open-ended tubular body. A lever, with a short leg on it, is pivoted on one side of the body; and the short leg has teeth in it to bite into the rope when the lever is pressed downwardly into engagement with the rope. When the lever is pulled upward, the rope is free to move through the tubular body. It is necessary to positively press the lever downward to secure the clamp.

It is desirable to provide a rope clamping apparatus which is of simple construction, easy to use, secure and capable of quick adjustment and release.

SUMMARY OF THE INVENTION

Accordingly, it is an object of this invention to provide an improved rope clamp device.

It is another object of this invention to provide an improved rope tie-down clamping apparatus.

It is an additional object of this invention to provide an improved rope tie-down apparatus capable of quickly and easily adjusting the size of a loop of rope formed by it.

It is a further object of this invention to provide an improved rope tie-down apparatus, which employs a clamping cam within it to securely hold the rope against movement in one directly relative to the apparatus, and which is quickly and easily manually released.

In accordance with a preferred embodiment of the invention, a rope tie-down clamp apparatus comprises housing which has a provision on it for securing one end of a rope. A passage is provided through the housing for a length of rope, and a clamping cam is mounted for movement in the housing from a first position where it engages the rope in the passage to a second position out of engagement with the rope. The clamping cam normally is biased into engagement with the rope to wedge the rope tightly between the cam and a portion of the passage in the housing in response to forces on the rope in a first direction relative to the housing. Movement of the rope relative to the housing in a second direction opposite to the first direction causes the clamping cam to be released. The clamping cam also is manually movable out of engagement with the rope when desired.

BRIEF DESCRIPTION OF THE DRAWINGS

FIGS. 4, 5 and 6 are side, top and a side sectional view, respectively, of another embodiment of the invention;

FIGS. 7 through 10 are side sectionalized views of other embodiments of the invention; and FIG. 11 is an exploded perspective view of the structure of FIG. 8.

DETAILED DESCRIPTION

Figure 1:
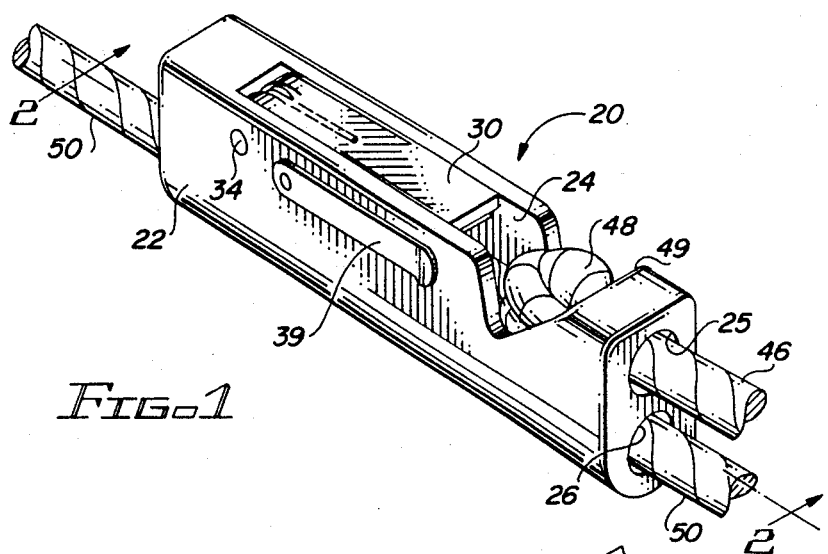
FIG. 1 is a perspective view of a preferred embodiment of the invention.

Reference now should be made to the drawings in which the same reference numbers are used throughout the different figures to designate the same or similar components. FIG. 1 is a perspective view of a preferred embodiment of the invention. This embodiment is in the form of a rope tie-down clamp device 20 comprising generally an elongated rectangular housing 22, which may be made of molded plastic or a metal casting of aluminum or other suitable material.

The central portion of the body of the housing 22 is a hollow chamber 24, which communicates at the right-hand end with upper and lower elongated circular passages 25 and 26, respectively. The lower passage 26 extends through the entire length of the housing 22 and exits at the left-hand end, as viewed in FIGS. 1 and 3. In the central portion, the passage 26 opens into the chamber 24. A pivoted, clamping cam comprising an elongated eccentric cam lever 30, is mounted in the upper portion of the chamber 24 for rotation about a pin 34 which passes through the chamber near its upper left-hand end, as viewed in FIGS. 1 and 2. The clamping cam lever 30 pivots about the pin 34, as shown most clearly in FIG. 2, and is normally biased downwardly by a spring 32 to project into the chamber 24. The spring 32 is wound about the pin 34 and has one end embedded into or attached to the clamping cam 30; and the other end presses against a surface 37 at the left-hand end of the chamber 24.

When the clamping cam 30 is pressed downwardly into its lowermost position, a depression or hole 44 formed part way through it is aligned with a corresponding hole through the sidewall of the chamber 20 into which a detent 41 extends. The detent 41 is carried by a leaf spring 39, mounted at its left-hand end on a pin 40 to secure it to the outside of the housing 22. Whenever the lever 30 is to be raised, the spring 39 may be pulled outwardly to release the detent 41 from the hole 44; so that the lever 30 may be extended to the dotted line position shown in FIG. 2.

Figure 2:
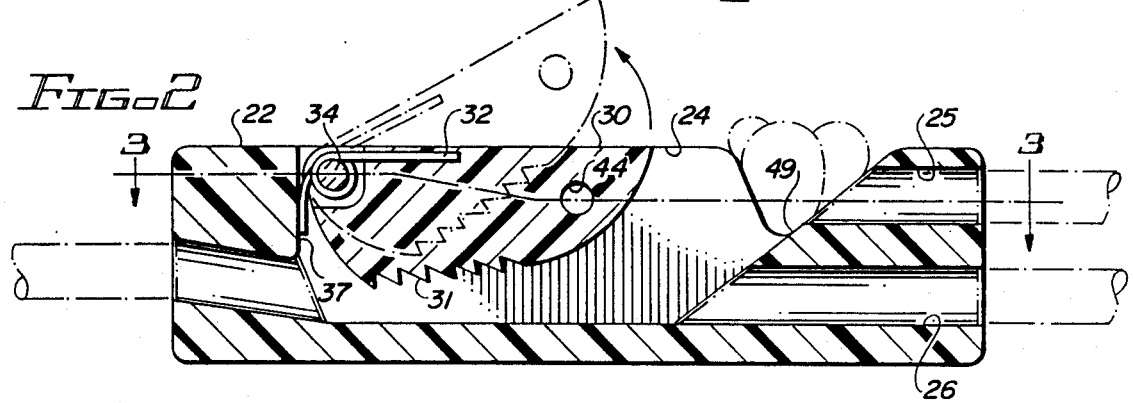
FIG. 2 is a side sectional view taken along the line 2—2 of FIG. 1.

To use the device shown in FIG. 1, one end of a rope 50 is first pushed through the passageway 36 from the left-hand side to the right, as viewed in FIGS. 1 and 2, to extend all of the way through the device. This is done with the lever 30 in the dotted line or upper position shown in FIG. 2. The rope 50 then is looped back on itself to form an upper return 46. This return is passed through the passageway 25 and knotted at a knot 48 on the left-hand end of the passageway 25, where it opens into the chamber 24 adjacent the inclined surface 49, shown in FIGS. 1, 2 and 3. The knot 48 then secures the rope in place to prevent it from being pulled outward to the right through the passageway 25.

Figure 4:
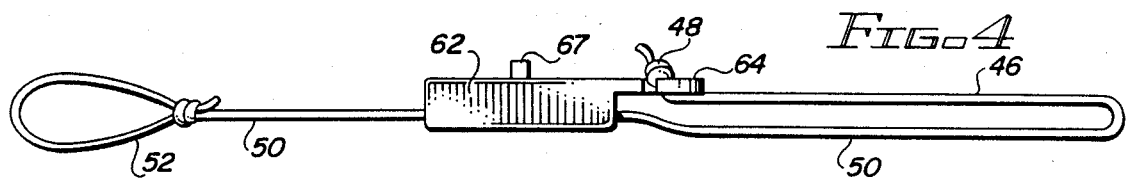

The other end of the rope 50, the left-hand end, then may be tied or fastened to another loop, such as the loop 52 shown in FIG. 4, to be secured at the opposite end for any suitable purpose such as a cargo tie-down or the like. When the loop 52 of FIG. 4, for example, is placed over a hook and the loop formed by the right-hand end with the tie-down device 20 is appropriately anchored at the other end, the tie-down device 20 may be pulled to the left, relative to the rope 50, with the clamping cam 30 in the upper or dotted line position shown in FIG. 2. This causes teeth 31 on the lower surface of the cam 30 to be moved out of engagement with the rope 50.

Even if the surface 31 of the cam 30 should rest on the surface of the rope 50, this relative movement causes the clamping cam 30 to be moved upwardly (counterclockwise) in the direction of the arrow by the relative movement between the rope 50 and the body or housing 22. Thus, the tie-down device 20 is used to shorten the effective length of the rope 50 between the two ends formed by the loops, such as shown in FIG. 4, until it is pulled tight. At this time, the cam 30 is pressed downwardly by the spring 32 to the solid line position shown in FIG. 2 to cause the teeth 31 to firmly bite into the rope 50 firmly holding it in place. Any attempt to move the housing 22 of the tie-down device toward the right relative to the rope 50, as viewed in FIGS. 1 and 2, further increases the clamping action of the device; so accidental loosening of the tie-down clamping apparatus 20 does not occur. The housing 22 of the apparatus relatively easily may be moved in a direction to shorten or tighten the rope, but movement in the opposite direction, which would tend to diminish the size of the loop at the right-hand end, cannot occur unless the clamping cam 30 first is manually raised to disengage it from the rope 50.

Figure 3:
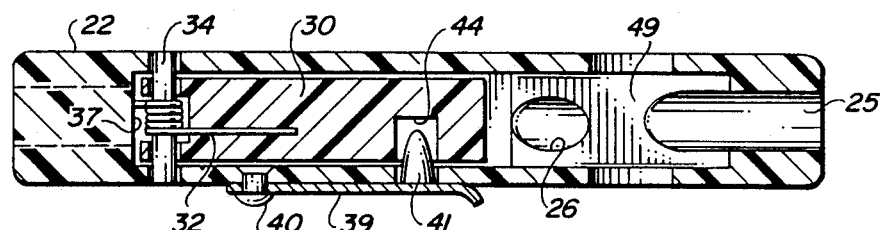
FIG. 3 is a top sectional view taken along the line 3—3 of FIG. 2.
Figure 5:
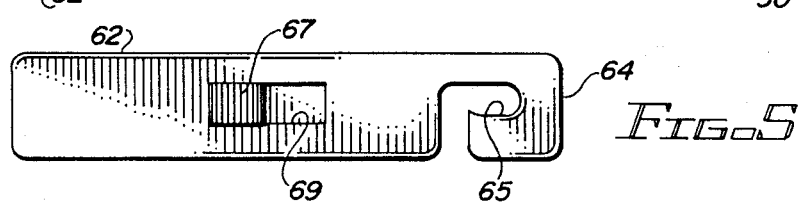

FIGS. 4, 5, and 6 are directed to another version of a tie-down clamping apparatus which operates in a manner identical to the embodiment of FIGS. 1 through 3, but which utilizes a different configuration for the cam. In the embodiment of FIGS. 4, 5 and 6, the main body portion housing 62 of the apparatus also may be made of molded plastic or a metal casting. A lower passage 66 which is comparable to the passage 26 of the device of FIGS. 1 through 3, is provided in the lower portion of the housing 62. The upper end (46) of the rope, however, is secured in a L-shape slot 65, formed in an extension 64 at the right-hand end of the device. The rope 46 is capable of being pre-knotted, with the end below the knot 48 moved into the slot 65 from the left-hand side, as viewed in FIG. 5 and then pulled toward the right, to secure the knot 48 in the slot 65 as illustrated in FIGS. 4 and 6.

The clamping cam 67 in the device shown in FIGS. 4, 5, and 6 is illustrated most clearly in the cross-sectional view of FIG. 6. Here it is seen that the internal chamber, where the cam engages the upper surface of the rope 50, is formed with an internal sloping surface 70 on the bottom side. The slope is at its lowest point at the left-hand end of the housing 62. A sliding cam 67 is placed in this cavity and has a manual engagement projection extending upwardly through a slot 69 in the top of the housing. A compression spring 72 is placed at the right-hand side of the chamber in the housing 62 and engages the sliding cam 67 to normally bias it toward the left, as viewed in FIG. 6. Teeth 71 on the bottom of the cam 67 engage the top of the rope 50 in this position (the clamping position), which is shown in FIG. 6.

The device of FIGS. 4 to 6 works in a manner which is identical to the one described above in conjunction with FIGS. 1 through 3. Relative movement of the housing 62 to the left with respect to the rope 50 to shorten the length of the rope between the two loops 52 and 46/50 tends to cause the cam 67 to be moved toward the right against the action of the spring 72. This results in the cam riding upwardly on the sloped surface 70 to disengage the teeth 71 from the rope 50. A similar operation is effected by movement of the cam 67 manually by the projection on its top from the left-hand position shown in FIG. 6 to engage the right-hand edge of the opening 69. This also disengages the teeth 71 from the rope 50. Any tendency for relative movement of the housing 62 to the right with respect to the rope 50 causes the cam action to more tightly wedge the cam 67 against the rope 50, with the teeth 71 pressing tightly down on the top of the rope, the bottom of which is pressed against the bottom of the passage 66 through the housing 62. This is a very tight wedging action to secure the rope 50 in place.

FIG. 7 is a cross-sectional view of an alternate embodiment which again, operates in the same manner as those described above in conjunction with FIGS. 1 through 6. The embodiment of FIG. 7 includes a housing 80 having a pivoted clamping cam 83/84 mounted on a pivot pin 81 and spring biased to the position shown by a spring 82, which is comparable to the spring 32 of the embodiment of FIGS. 1 through 3. The hollow interior chamber of the device shown in FIG. 7 has an upper surface 88 which is engaged by one end of the spring 82, the other end of which engages the cam 83/84. The rope 46/50 is secured in a pair of passageways 85 and 86 in a manner similar to the manner in which the rope is secured in the passageways 25 and 26 of the embodiment of FIG. 1.

The operation of the device of FIG. 7 is otherwise the same as the embodiment of FIGS. 1 through 3 and of FIGS. 4 through 6. Relative movement of the housing 80 to the left with respect to the rope 50 causes the eccentric cam 83/84 to pivot counterclockwise about the pin 81 to disengage the camming action, so that the clamping tie-down device quickly may be tightened onto the rope 50. Once this occurs, the device may be released; and any relative movement of the housing 80 toward the right with respect to the rope 50, causes the cam 83/84 to pivot clockwise to increase the force of the teeth 84 pressing down on the rope 50. This wedges the rope 50 between the teeth 84 on the lower surface of the cam 83/84 and the bottom of the channel 86 in the housing 80. Thus, the rope 50 is securely held against forces in this direction; and, therefore, remains tightly in place until manual release is effected by movement of the upper lever 83 of the cam toward the left to pivot the toothed bottom portion 84 counterclockwise to disengage the rope 50. A very secure locking occurs with this device.

FIGS. 8 and 11 illustrate another embodiment of the invention which operates in a manner similar to the previously described embodiments but which does not require a separate spring. The embodiment of FIG. 8 uses a cylindrical cam roller 92 which has teeth around its surface. The roller 92 is eccentrically mounted on a pivot pin 93 in an opening in the housing 90 of the device.

As illustrated in FIG. 11, the housing may be made in two separate castings or molded parts 90A and 90B which mate together to form the upper and lower channels 95 and 96 for the rope and which form the two sides of the cavity in which the eccentric toothed cam cylinder 92 is mounted. The rope 46, 50 is secured in the channels 95 and 96 in the same manner described previously in conjunction with the embodiment of FIGS. 1 through 3. The inherent nature of the mounting of the cam 92 is that when the device is an upright position, as shown in FIGS. 8 and 11, gravity tends to cause the cam 92 to pivot about the pin 93 in a clockwise direction to the solid line position shown in FIG. 8. In this position, relative movement of the housing 90 toward the left with respect to the rope 50 tends to move the cam 92 counterclockwise or upwardly to facilitate positioning or tightening of the rope.

Any relative movement of the housing 90 toward the right, as viewed in FIG. 8, with respect to the rope 50, however, causes a tighter engagement of the teeth on the surface of the cam 92 with the rope to more securely wedge the rope and housing together. This prevents any movement between the two unless the cam 92 first is manually pivoted upwardly counterclockwise to the dotted line position of FIG. 8.

If desired, a spring comparable to the spring shown in the embodiments of FIGS. 1 and 7, also may be used in conjunction with the cam 92 of FIGS. 8 and 11 to cause it normally to be biased into engagement with the rope 50. If a spring is used, the device of FIGS. 8 and 11 could be used in any position. Without a spring, it is necessary for the device of this embodiment to be utilized in an upright position, as illustrated in FIGS. 8 and 11.

The device of FIG. 9 is another embodiment employing a cylindrical section to wedge the rope 50 against a surface in the housing 100 of the device shown. The operation of the device of FIG. 9 is similar to the operation of the device of FIG. 8. No pivot pin is used, but the chamber in which the clamping cam cylinder 104 is located has an inclined surface 101, comparable to the inclined surface 70 of the embodiment of FIG. 6. The right-hand end of the chamber, in which the clamping cylinder 104 is placed, is a downward projection 103. This projection serves as an abutment or stop to hold the cylinder 104 in place. The rope 46/50 is secured in the device in a pair of passageways 105 and 106 in a manner similar to that already described in conjunction with FIG. 1. Relative movement of the housing 100 toward the left with respect to the rope 50 causes the cylinder 104 to roll along the rope 50 toward the abutment 103. This thereby releases the rope 50 relative to the housing 100; so that this movement is easily effected.

Any movement, however, of the housing 100 toward the right with respect to the rope 50, as viewed in FIG. 9, causes the cylinder 104, which is toothed about its periphery in a manner similar to the cylinder 92 of the embodiment of FIG. 8, to roll down the ramp and into tight engagement with the rope 50 to wedge the rope tightly between the cylinder 104 and the lower surface of the passage 106 in the housing 100. Release of the device of FIG. 9 is effected by a sharp pull of the housing 100 toward the left with respect to the rope 50. When the housing 100 is rotated 180° from the position shown in FIG. 9, the cam cylinder 104 rolls downwardly into engagement with the projection 103, and free movement of the housing 100 relative to the rope 50 in either direction may be effected.

FIG. 10 illustrates an alternative embodiment to the one shown in FIG. 6. This embodiment operates in the same manner as the embodiment of FIG. 6. In the device of FIG. 10, however, the body or housing 110 does not have a slot in its top, but simply employs an enlarged opening in the left-hand end of the passage 116 to accommodate a "push-button" extension of the cam 117 for manual disengagement of the cam 117 whenever desired. A downwardly sloping surface 111 inside the housing 110 is engaged by a mating upward surface of the cam 117 which has a series of teeth 119 on its lower surface for engaging the rope 50 in the channel 116. The other end of the rope 46 is held in the channel 115 in the same manner described previously in conjunction with the embodiment of FIG. 1. The operation of the device of FIG. 10 is identical to that of FIG. 6, except that when release of the cam 117 is desired, the projection on the cam 117 is moved to the right to abut the outside left edge of the housing 110, against the force of the spring 121, to disengage the teeth 119 from the rope 50.

All of the various embodiments of this invention which are described above operate in a similar manner to quickly and effectively secure a tie-down device across a cargo or between two points. The tie-down device itself readily may be moved to shorten the rope between the two points by effectively enlarging the loop provided by the portions 46 and 50 at the right-hand end of each of the devices, as illustrated, thereafter securely holding the device in place against any forces which would tend to extend the length of the rope between the two loops, as illustrated in FIG. 4. In each of the configurations, release is effectively and quickly accomplished by means of manual movement or release of the clamping cam, so that the device may be loosened and stored for subsequent use. It should be noted that the detent holding device, which is described in conjunction with the embodiment of FIGS. 1 through 3, also may be employed with all of the other embodiment, if desired. The operation is the same in every case, and provisions may be made with the clamping cams of all of the embodiments to accommodate the detent 41 when the clamping cams are in their clamping or rope engaging positions. The housing construction of FIG. 11 also may be used for the other embodiments.

Various changes and modifications will occur to those skilled in the art without departing from the true scope of the invention. The different embodiments which have been described and which are shown in the drawing, are illustrative only of the invention. Various other types of cam arrangements, operating in the manner described, will occur to those skilled in the art without departing from the true scope of the invention as described in the appended claims.

I claim:

1. A rope tie-down clamp apparatus including in combination:
   an unattached housing;
   a first longitudinal passage through said housing for a length of rope;
   a second longitudinal passage through a portion of said housing, said second passage being parallel to said first passage;
   means on said housing for securing one end of said rope to said second passage through said housing to form a loop of rope outside said housing between said first and second passages;
   a clamping cam mounted for movement in said housing from a position engaging said rope in said first passage to a position out of engagement with said rope;
   means for normally biasing said clamping cam into engagement with said rope for wedging said rope tightly between said cam and a portion of said first passage in response to forces on said rope in a first direction relative to said housing, movement of said rope relative to said housing in a second direction, opposite to said first direction, causing said clamping cam to be urged out of engagement with said rope; and
   means for manually moving said clamping cam out of engagement with said rope.

2. The combination according to claim 1 wherein said means for biasing said clamping cam into engagement with said rope comprises a resilient biasing means.

3. The combination according to claim 2 wherein said resilient baising means comprises a spring member.

4. The combination according to claim 3 wherein said spring member extends between a portion of said housing and a portion of said clamping cam.

5. The combination according to claim 4 wherein said clamping cam is mounted for pivotal movement in said housing and pivots toward said first passage in response to said means for normally biasing said clamping cam into engagement with said rope.

6. The combination according to claim 5 further including a pivot pin extending transversely across said housing; and wherein said clamping cam is mounted for eccentric rotational movement about said pivot pin.

7. The combination according to claim 6 further including means for releasably holding said clamping cam in engagement with said rope.

8. The combination according to claim 7 wherein said holding means comprises a spring biased detent member having means thereon for securing said clamping cam and said housing together in a fixed position.

9. The combination according to claim 8 wherein said biasing means comprises a detent member mounted on said housing and extending into the interior thereof and said clamping cam has a recess therein for receiving said detent.

10. The combination according to claim 4 wherein said clamping cam is mounted for reciprocating movement in a direction parallel said first passage.

11. The combination according to claim 10 wherein said housing has an inclined surface facing said first passage and said clamping cam is mounted for longitudinal movement parallel to said first passage and has a mating inclined surface thereon, said surface in said housing located to cause said clamping cam to be wedged between said inclined surface in said housing and said rope in said first passage in response to forces on said rope relative to said housing in said first direction.

12. The combination according to claim 11 wherein said means for manually moving said clamping cam out of engagement with said rope comprise a manually engagable extension on said clamping cam for sliding said clamping cam away from said inclined surface.

13. The combination according to claim 12 wherein said means for biasing said clamping cam comprises compression spring means normally forcing the mating inclined surface on said clamping cam into engagement with said inclined surface in said housing.

14. The combination according to claim 1 wherein said clamping cam is mounted for pivotal movement in said housing and pivots toward said first passage in response to said means for normally biasing said clamping cam into engagement with said rope.

15. The combination according to claim 1 wherein said clamping cam is mounted for reciprocating movement in a direction parallel said first passage.

16. The combination according to claim 1 wherein said housing has an inclined surface facing said first passage, said clamping cam is mounted for longitudinal movement parallel to said first passage and has a mating inclined surface thereon, and said surface in said housing located to cause said clamping cam to be wedged between said inclined surface in said housing and said rope in said first passage in response to forces on said rope relative to said housing in said first direction.

17. The combination according to claim 16 wherein said means for biasing said clamping cam comprises compression spring means normally forcing the mating inclined surface on said clamping cam into engagement with said inclined surface in said housing.

18. The combination according to claim 1 further including a pivot pin extending transversely across said housing; and wherein said clamping cam is mounted for eccentric rotational movement about said pivot pin.

19. The combination according to claim 1 further including means for releasably holding said clamping cam in engagement with said rope.

* * * * *